United States Patent [19]
Wells et al.

[11] Patent Number: 5,696,977
[45] Date of Patent: *Dec. 9, 1997

[54] POWER MANAGEMENT SYSTEM FOR COMPONENTS USED IN BATTERY POWERED APPLICATIONS

[75] Inventors: Steven E. Wells, Citrus Heights; Virgil Niles Kynett, El Dorado Hills; Terry L. Kendall, Placerville; Richard Garner, Cameron Park, all of Calif.

[73] Assignee: Intel Corporation, Santa Clara, Calif.

[*] Notice: The term of this patent shall not extend beyond the expiration date of Pat. No. 5,603,036.

[21] Appl. No.: 621,248

[22] Filed: Mar. 25, 1996

Related U.S. Application Data

[63] Continuation of Ser. No. 19,617, Feb. 19, 1993, Pat. No. 5,603,036.

[51] Int. Cl.⁶ .................................. G06F 1/32; G06F 1/04
[52] U.S. Cl. .............................................. 395/750; 395/560
[58] Field of Search ........................... 395/750, 550, 395/555, 560; 364/707

[56] References Cited

U.S. PATENT DOCUMENTS

| | | |
|---|---|---|
| 4,545,030 | 10/1985 | Kitchin . |
| 4,615,005 | 9/1986 | Maejima et al. ............... 395/550 |
| 4,642,759 | 2/1987 | Foster . |
| 4,644,494 | 2/1987 | Muller . |
| 4,758,945 | 7/1988 | Remedi ........................... 395/750 |
| 4,851,987 | 7/1989 | Day ................................ 395/550 |
| 4,853,560 | 8/1989 | Iwamura et al. . |
| 4,896,262 | 1/1990 | Wayama et al. . |
| 4,912,346 | 3/1990 | Mizuta . |
| 4,916,662 | 4/1990 | Mizuta . |
| 4,958,315 | 9/1990 | Balch . |
| 4,980,836 | 12/1990 | Carter et al. . |
| 5,008,566 | 4/1991 | Hashimoto . |
| 5,012,425 | 4/1991 | Brown . |
| 5,070,474 | 12/1991 | Tuma et al. . |
| 5,077,737 | 12/1991 | Leger et al. . |
| 5,131,089 | 7/1992 | Cole . |
| 5,148,380 | 9/1992 | Lin et al. . |
| 5,167,024 | 11/1992 | Smith et al. ..................... 395/375 |
| 5,172,342 | 12/1992 | Gochi . |
| 5,184,031 | 2/1993 | Hayakawa et al. . |
| 5,189,647 | 2/1993 | Suzuki et al. . |
| 5,193,198 | 3/1993 | Yokouchi . |
| 5,200,959 | 4/1993 | Gross et al. . |
| 5,239,652 | 8/1993 | Seibert et al. ................... 395/750 |
| 5,261,082 | 11/1993 | Ito et al. ......................... 395/550 |
| 5,267,218 | 11/1993 | Elbert . |
| 5,291,542 | 3/1994 | Kivari et al. . |
| 5,369,771 | 11/1994 | Gettel . |
| 5,392,437 | 2/1995 | Matter et al. ................... 395/750 |
| 5,452,401 | 9/1995 | Lin ................................ 395/750 |
| 5,452,434 | 9/1995 | MacDonald .................... 395/550 |
| 5,546,568 | 8/1996 | Bland et al. .................... 395/550 |
| 5,560,002 | 9/1996 | Kardach et al. ................ 395/550 |
| 5,603,036 | 2/1997 | Wells et al. ..................... 395/750 |

FOREIGN PATENT DOCUMENTS

| | | | |
|---|---|---|---|
| 2088442 | 7/1993 | Canada ........................... G06F 13/16 |
| 0175458A2 | 3/1986 | European Pat. Off. ......... G06F 12/08 |
| 0392895A2 | 10/1990 | European Pat. Off. ......... G11C 16/06 |
| 2251323 | 7/1992 | United Kingdom ............ G06F 12/02 |
| 2251324 | 7/1992 | United Kingdom ............ G06F 12/02 |

OTHER PUBLICATIONS

Robinson, Kurt, "Trends in Flash Memory System Design", *Wescon Conference Record*, Nov. 1990, pp. 468–472.

*Primary Examiner*—Glenn A. Auve
*Attorney, Agent, or Firm*—Blakely, Sokoloff, Taylor & Zafman

[57] ABSTRACT

A control circuit for a computer component circuit which includes oscillator apparatus for providing square wave pulses at a prescribed frequency, gating apparatus for providing the square wave pulses at an output terminal for use as a clock for the component circuit, timing apparatus for sensing a period during which the component circuit has not performed an operation, and apparatus for disabling the gating apparatus for providing the square wave pulses at an output terminal.

9 Claims, 5 Drawing Sheets

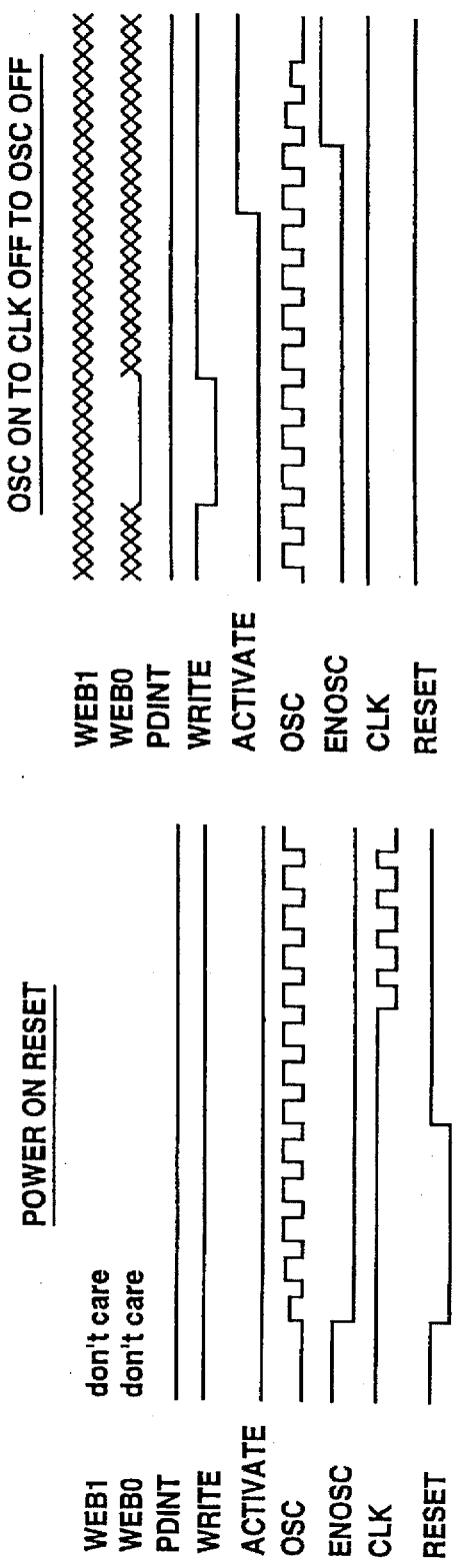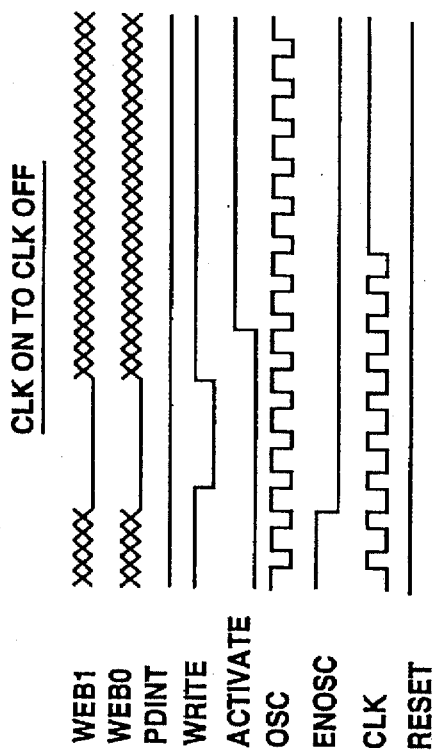
FIGURE 4a
FIGURE 4b
FIGURE 4c

POWER MANAGEMENT SYSTEM FOR COMPONENTS USED IN BATTERY POWERED APPLICATIONS

This is a continuation of application Ser. No. 08/019,617, filed Feb. 19, 1993, now U.S. Pat. No. 5,603,036.

BACKGROUND OF THE INVENTION

1. Field of the Invention

This invention relates to battery powered computer systems and, more particularly, to methods and apparatus for reducing the power requirements of computer subsystems associated with a battery powered host computer.

2. History of the Prior Art

It is very difficult to provided sufficient energy to operate a battery powered electronic device for any length of time. Most people are familiar with the constant need to replace the batteries used by radios and tape recorders and to recharge the batteries of those electronic devices which are rechargeable. Capable methods of providing power to operate such devices for extended periods have not yet been devised. Batteries having a useful lifespan are simply to heavy for many portable devices.

This is especially true of portable computers in which a number of components provide a constant drain on the batteries during operation. For example, many portable computers utilize large electro-mechanical hard disk drives in order to store the large programs which have become prevalent and large displays in order to display those programs in operation. The operation of these subsystems requires substantial amounts of energy. Certain portable computers now utilize color displays which require even larger amounts of energy than do the displays of typical portable computers. Because of these energy-consuming components, it is unusual to find a portable computer which is able to operate for longer than two hours on batteries. This is much less time than most longer air flights, an application in which such computers see a great deal of battery use.

For this reason, designers have been providing methods and apparatus for conserving the energy utilized by portable computers. In general, these have encompassed arrangements for turning off the display and the electro-mechanical hard disk drive after some period of time. These solutions have provided substantial savings in energy and have helped portable computers reach the present state in which over two hours of operating time is realized.

One problem with these power conservation methods is that the amount of energy which can be saved with such components is limited. Moreover, the particular methods must be carefully designed or they are likely to utilize more energy than they save. For example, an electro-mechanical hard disk drive requires a substantial amount of energy and time to spin up to the active condition from an off condition. If such a disk drive is constantly turned off after each use, then the energy consumed in bringing it back into operation may be greater than the energy saved by turning it off. It is for this reason that some interval is usually interposed before a disk drive is powered down from its last use. It is also for this reason that the amount of energy which can be saved with such components is limited.

To solve the problem of energy use and for other reasons, forms of long term storage other than electro-mechanical hard disk drives have recently been used in portable computers. One of these forms of long term storage is a flash EEPROM memory array. A flash EEPROM memory array includes a large plurality of floating-gate field effect transistors arranged as memory cells in typical row and column fashion with circuitry for accessing the individual cells and placing the memory transistors of those cells in one of two memory conditions. A flash EEPROM memory cell, like a typical EPROM cell retains information when power is removed but does not require removal from the system to be erased. Flash EEPROM memory has a number of features which adapt it to use as long term memory. It is light in weight and occupies very little space. It is especially rugged. It will withstand without adverse effects repeated drops each of which would destroy a typical electro-mechanical hard disk drive. Because it is electronic rather than electro-mechanical, a flash EEPROM memory consumes less energy than electro-mechanical disk drives. Although flash EEPROM memory arrays use less energy than the typical electro-mechanical hard disk drive in active operation, it would be very useful were it possible to further reduce the energy required for the operation of these subsystems and other subsystems which utilize internal microprocessors, logic circuitry, and random access memory.

SUMMARY OF THE INVENTION

It is, therefore, an object of the present invention to provide a method for significantly reducing the energy used by a flash EEPROM memory array.

It is another object of the present invention to provide a method for automatically reducing the use of power in a flash EEPROM memory array.

These and other objects of the present invention are realized in a control circuit for a computer component circuit comprising a microprocessor, an oscillator for providing square wave pulses at a prescribed frequency from which clock pulses may be generated, apparatus for providing the square wave pulses at an output terminal as clock pulses, means for disabling the provision of the square wave pulses at an output terminal as clock pulses in response to a command from the microprocessor, means for disabling the oscillator in response to a command from the microprocessor, and means for restarting the provision of square wave pulses at an output terminal as clock pulses in response to any command from a host with which the control circuit is associated.

These and other objects and features of the invention will be better understood by reference to the detailed description which follows taken together with the drawings in which like elements are referred to by like designations throughout the several views.

BRIEF DESCRIPTION OF THE DRAWINGS

FIGS. 4a, 4b and 4c are a timing diagram illustrating various signals used in the operation of the circuit of FIG. 3.

NOTATION AND NOMENCLATURE

Some portions of the detailed descriptions which follow are presented in terms of symbolic representations of operations on data bits within a computer memory. These descriptions and representations are the means used by those skilled in the data processing arts to most effectively convey the substance of their work to others skilled in the art. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. In all cases the distinction between the method operations in operating a computer and the method of computation itself should be borne in mind. The present invention relates to a method and to apparatus for operating a computer in processing electrical or other (e.g. mechanical, chemical) physical signals to generate other desired physical signals.

DETAILED DESCRIPTION

Figure 1:
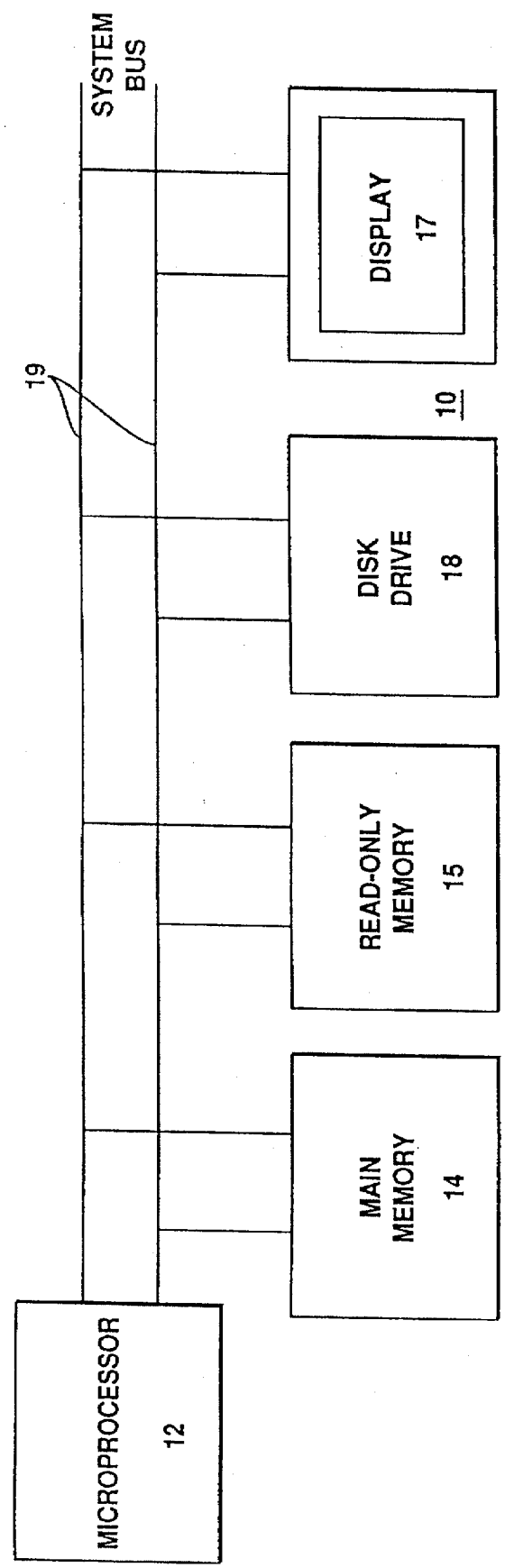
FIG. 1 is a block diagram illustrating a prior art circuit.

Because of the need to conserve energy in battery powered devices which utilize microprocessors, it is typical for such devices to include arrangements for causing the microprocessor of the host computer to place various components or subsystems of the system which use a great deal of energy in a standby condition after some period of time. Referring now to FIG. 1, a block diagram of a system 10 is illustrated which demonstrates the prior art method of conserving energy in subsystems used in portable electronic devices which are controlled by a microprocessors such as a computer. The system 10 includes a microprocessor 12 which operates as a central processing unit under control of programs and processes which may be stored in an associated main memory 14 or be a part of a read only memory 15. The microprocessor 12 is associated with other components such as a display 17 and an electro-mechanical hard disk drive 18 which provides long term memory for the system. The microprocessor 12 runs processes which control the operation of some of these components such as the display 17 and which cooperate with control circuitry which may be a physical part of other of the components such as the disk drive 18 to control such components. For the purpose of this specification, the microprocessor 12 may be considered to transfer addresses and data to and receive addresses and data from one or more of these components via a system bus 19.

One type of program which the microprocessor 12 may run monitors the display 17 or the drive 18 or both to determine when the particular component last conducted an operation. Each time a read, write, or erase operation of the drive 18 or a change in the display 17 is completed, a timer process is begun by the microprocessor 12. Each time a component being monitored is operated to change information, the timer process is reset. If the component does not operate to change information for the period set by the timer process, the microprocessor 12 sends a "power down" signal to the component. With a display, this signal is typically used to reduce the power to the display to a lower level at which the display is blanked. With a disk drive, the power is typically cut off so that disks of the drive stop rotating; typically, the controller circuitry on the drive continues to operate so that it may receive a reset command from the microprocessor 12 to turn the drive back on and allow the drive to respond to other commands.

Thus, a software program run by the system central processing unit may measure the time since the last use of a hard disk drive or a display and place that component in a low power mode or turn it off after some selectable period of time such as one or two minutes. With a component such as an electro-mechanical hard disk drive, this time period is usually fairly long because of the energy cost required to turn the device back on and the length of time required to do so. For example, an electro-mechanical hard disk drive takes a number of seconds and consumes a great deal of energy in reaching its proper speed of rotation. Because these time periods are quite long, the amount of energy which can be saved is somewhat limited.

Figure 2:
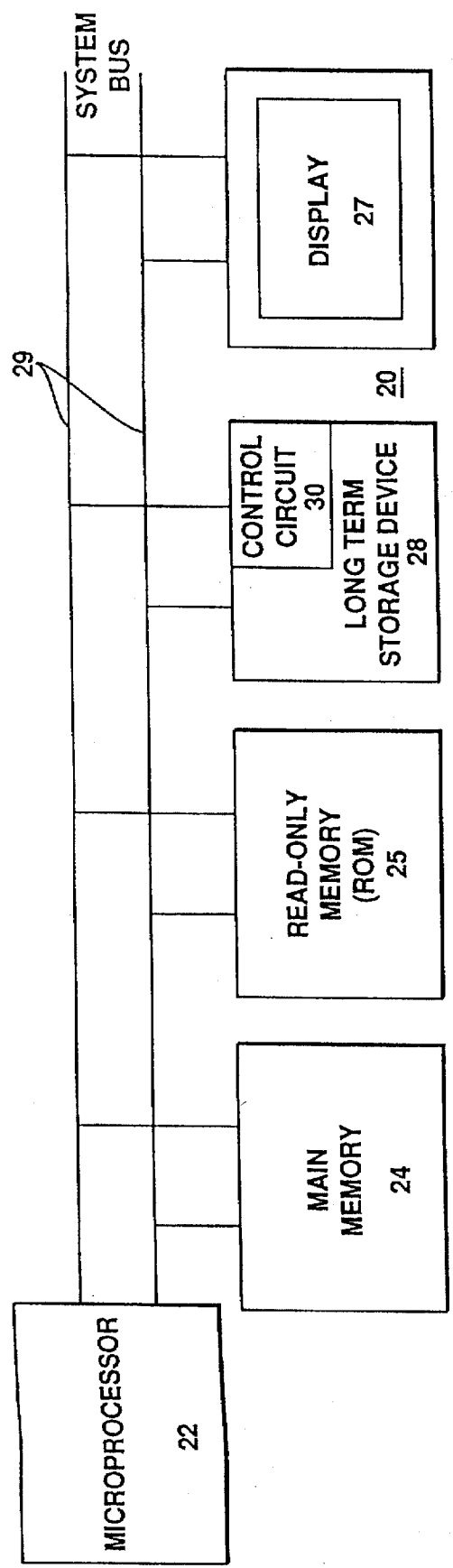
FIG. 2 is a block diagram illustrating a circuit designed in accordance with the present invention.

FIG. 2 illustrates a block diagram of a system 20 designed in accordance with the present invention to conserve the use of energy in a battery powered device. The system 20 includes a microprocessor 22 which operates as a central processing unit under control of programmed commands which may be stored in an associated main memory 24 or be a part of a read only memory 25. The microprocessor 22 is associated with other components such as a display 27 and a long term storage device 28 over a system bus. For the purpose of illustration, the long term storage device may be a flash EEPROM memory array. However, any of a number of other components each of which include an internal microprocessor for controlling the operation of the component might function in a similar manner in so far as the present invention is concerned.

The component 28 and the display 27 provide control signals to the microprocessor 22 so that the microprocessor 22 may measure the time since the last operation of a component and provide signals to place such a component in a low power mode after some period in which no active operation by the component has occurred. Alternatively, the microprocessor 22 may interrogate those components (as in the prior art arrangement illustrated in FIG. 1) so that the microprocessor 22 may measure the time since the last active operation of a component and provide signals to place such a component in a low power mode. Each of the components 27 and 28 responds to the signals from the microprocessor 22 in the manner provided by the prior art and assumes a low power state.

However, the component 28 also incorporates a control circuit 30 which includes its own microprocessor. The microprocessor of the control circuit 30 may function not only under the control of commands from the host microprocessor 22 but may also operate in response to programs stored within the control circuit 30. For example, the microprocessor of the control circuit 30 may respond to programs stored in read only memory within the control circuit 30 to monitor the time since a last operation was conducted by the component 28. If that time is longer than a prescribed period, then the microprocessor of the control circuit 30 may place the component 28 into a low power state. This is especially significant because the time periods utilized by the control circuit 30 in responding to commands may be better adapted to preserve energy in the operation of the component 28 than those of the central processing unit of the host computer system. For example, a a control circuit 30 of a flash EEPROM memory array which includes a microprocessor is capable of writing to the memory within a period of approximately 10 milliseconds and of reading within a small number of milliseconds even though completely turned off as long as power is not removed from associated random access memory and an oscillator circuit which drives a clock is maintained. The industry specification for response to a host computer command by an IDE hard disk drive is 400 nanoseconds, and a flash EEPROM memory array can respond to commands without any problems within this amount of time. This means that the memory array can shut down completely almost immediately after a reading, writing, or erase operation has ended and remain shut down until the next time it is to perform an operation.

This provides a very great savings in energy use for such a component over that typically used in a battery powered device. However, not only may the period during which power is furnished to the microprocessor-controlled component be much more closely controlled, but the particular circuitry receiving the power in the component may be closely controlled. For example, in order to be able to respond to commands from a host central processing unit within a period of time which is sufficiently short that the host is not aware of the shut down of the component, certain of the logic circuitry of the control circuit should remain active and have a clock available within the normal time for response to a command. This may be accomplished if the oscillator which generates the signals from which the clock is derived is kept running. In such a case, the oscillator will not require any time to rise to its appropriate full wave form condition but will be generating square waves at all times. Then all that is necessary is for the clock to be turned on. This may occur in only a few nanoseconds. Thus, the control circuitry of such a memory array may respond to commands from the host computer as though it had never been turned off.

In an alternative operation, the microprocessor-controlled flash EEPROM memory array may respond to a power down signal from the host computer by turning off both the oscillator and the clock. The host computer expects that the circuitry of a disk drive memory will be off when it has sent a power down command and, consequently, provides a normal power up time before sending commands to which the component must respond. Typically, the host will enable the power up by generating a reset signal which is transferred to the component to cause its circuits to turn on.

Figure 3:
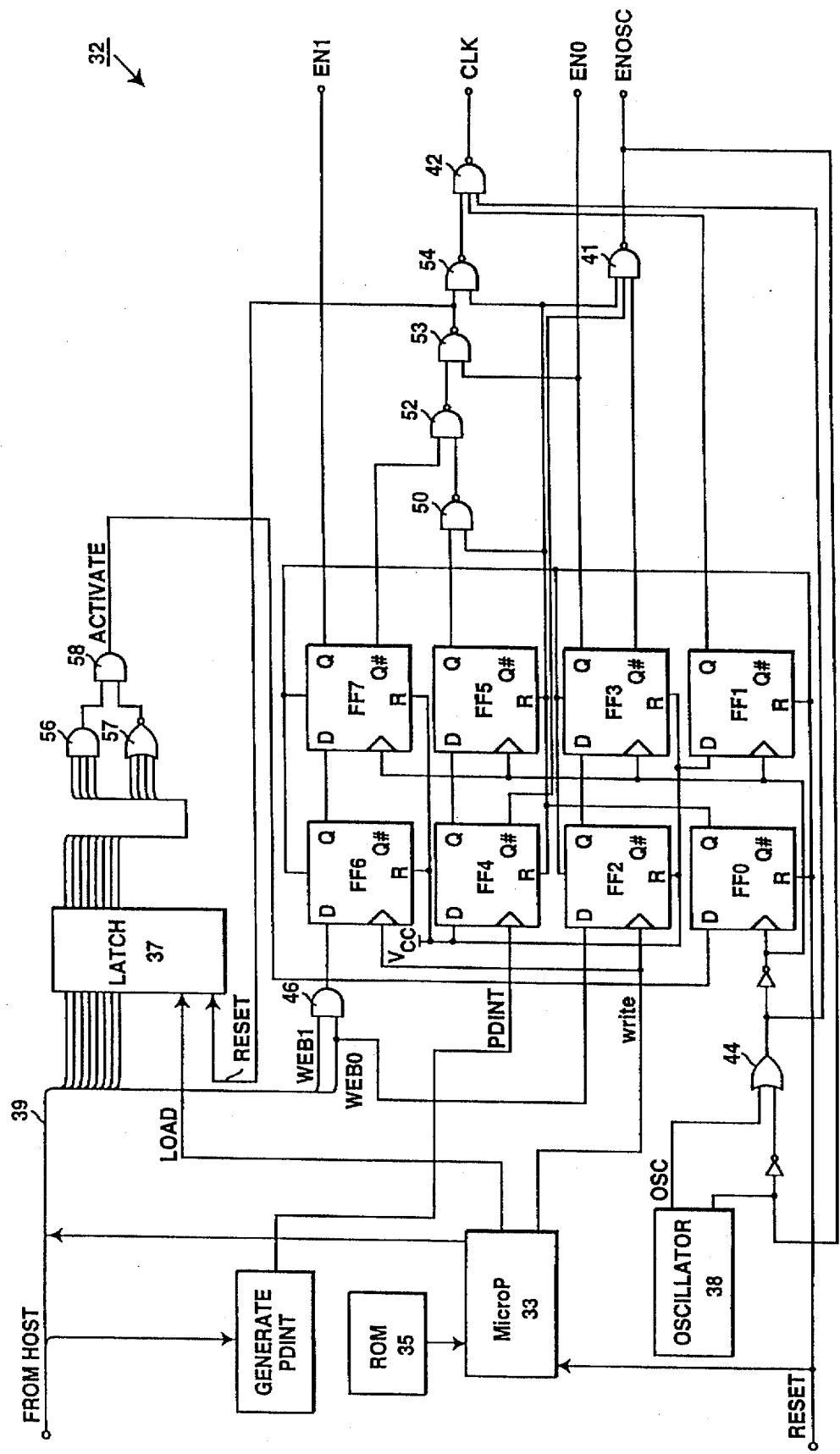
FIG. 3 is a detailed diagram illustrating one embodiment of a circuit constructed in accordance with the present invention.

FIG. 3 illustrates a circuit 32 designed in accordance with the present invention. The circuit 32 includes a portion of the circuitry utilized for controlling the operation of a flash EEPROM memory array. Such a circuit is described, for example, in U.S. patent application Ser. No. 07/969,131, entitled Method And Circuitry For A Solid State Memory Disk, S. Wells et al, filed Oct. 30, 1992, and assigned to the assignee of the present invention. The circuit 32 includes a microprocessor 33 which is adapted to run various control processes. These control processes may be stored in read only memory 35 within the control circuitry which includes the circuit 32. These processes allow the microprocessor 33 to provide various services which allow the array to function to store data efficiently. Although any number of microprocessors might be used, one embodiment of the invention utilizes an Intel 80188 microprocessor.

The circuit 32 also includes a latch 37 utilized to store input commands addressed to the circuit 32. In one embodiment, the latch 37 stores an eight bit value which may be written on an internal bus 39. When a value is to be written to the latch 37, a write signal is furnished by the microprocessor 33 at an input terminal LOAD of the latch 37.

The circuit 32 also includes an oscillator circuit 38 which generates a chain of square wave pulses which are used to produce a clock for the array. In one embodiment, the oscillator circuit 38 includes a crystal and circuitry for producing the appropriate square-wave pulses (signal OSC) in a manner well known to the prior art. These pulses are used by the circuit 32 to produce the clock (signal CLK). The circuit 38 receives a signal ENOSC furnished as an output from the circuit 32 which is used to enable and disable the oscillator 38. The circuit 32 also includes a number of D flip-flop circuits FF0–FF7 and various logic gates all of which are individually well known to the prior art but which are combined uniquely to produce the results described hereinafter. The circuit 32 produces the output signal CLK which is used in the various operations for controlling the memory array (which is a flash EEPROM memory array in one embodiment).

It will be presumed that the circuit 32 is in the off state in which neither a CLK or an ENOSC signal is being produced; the circuit 32 may be placed in this state by a power down command from the host computer or from the microprocessor 33. In order to cause the circuit 32 to provide clock signals when it is in the off state, a RESET signal is asserted at the reset terminals of flip-flop circuits FF0 and FF1. In the embodiment illustrated, the RESET signal is a negative going pulse (a zero value) which is typically furnished by the microprocessor 22 of the host computer of FIG. 2. The RESET signal may be produced in different ways, but for the purposes of this invention is typically produced by a host computer whenever power is applied to the host. The signal might also be produced by the microprocessor 33. This RESET signal causes the flip-flop circuits FF0 and FF1 to produce zero valued output signals at their Q output terminals. The zero valued signal (RESET) is also applied to a set terminal of the flip-flop circuits FF6 and FF7 and sets each of the flip-flops FF6 and FF7.

The zero valued signal at the Q output terminal of the flip-flop FF0 is applied as an input to a NAND gate 41. The zero value at the input terminal to the NAND gate 41 generates a one valued output for the signal ENOSC. This signal ENOSC is fed back to turn on the oscillator circuit 38. Similarly, the zero valued signal at the output terminal of the flip-flop FF1 is applied as an input to a NAND gate 42. The zero value at the input terminal to the NAND gate 42 generates a continuous one valued output for the signal CLK. The one value masks any initial start up values which may be produced by the oscillator 38 so that no oscillating clock output signal is yet produced.

As in shown in FIGS. 4a, 4b and 4c when the oscillator 38 turns on in response to the ENOSC signal, it furnishes an output signal which gradually builds to the appropriate repeating square wave value used to produce clock signals CLK. The signal OSC produced by the circuit 38 is applied to an OR gate 44. The other terminal of the OR gate 44 receives the inverted ENOSC signal (a zero) so that the signal OSC is transferred through the gate 44, inverted, and applied to the clock terminals of flip-flops FF0, FF1, FF3, FF5, and FF7. The flip-flops FF1, FF3, FF5, and FF7 act to synchronize the commands furnished by the external host microprocessor to the internal clock CLK of the circuit 32. When the RESET signal is released after a few milliseconds, the flip-flop FF1 clocks through a one value provided by a source Vcc and applied at its D input terminal to one input terminal of the NAND gate 42. Simultaneously, the flip-flop FF0 continues to provide a zero value at its Q output terminal; this value is transferred to an input terminal of a NAND gate 54. This value is inverted by the gate 54 and furnished to another input terminal of gate 42 as a one value. The chain of signals OSC at the output terminal of the OR gate 44 is also applied at an input terminal of the NAND gate 42. The pair of one values on the other input terminals of the gate 42 allow the chain of signals OSC to be clocked through the gate 42 to produce an oscillating clock output signal CLK at the rate of the OSC signal. Again, it should be noted that the flip-flops FF3, FF5, and FF7 are utilized to synchronize the inputs furnished on the various input conductors so that the clock pulses produced by the circuit 32 are of uniform length even for the first pulses to appear when the clock is turned on. A similar affect occurs when the oscillator is turned off.

Thus, it may be seen that in response to a reset signal provided by the host computer, the circuit 32 first masks the clock output during the period of buildup of the OSC signals to full wave value and then allows the transfer of the signal CLK. This is the normal response of the circuit 32 to a reset signal from the host computer after a complete power down has occurred and power is again applied to the computer. It should be noted that the flip-flop FF7 which has been placed in the set state by the initial reset input signal provides a one valued output signal at its Q output terminal. The signal is transferred to a terminal EN0 and may be used to indicate the condition of the clock signal generator as on to other circuitry.

During normal operating conditions once the reset signal has been applied, both the oscillator output OSC and the clock signals CLK are produced. The input to the D input terminal of the flip-flop FF0 remains a zero during normal operating conditions. This zero value causes a zero to be generated at the Q output terminal of the flip-flop FF0 which is applied to the NAND gate 41. This zero value causes the signal ENOSC to continue as a one and continue to enable the oscillator circuit 38. During normal operating conditions, the Q output terminal of the flip-flop FF0 also furnishes a zero value to a NAND gate 54. The NAND gate 54 inverts this zero value and furnishes a one input value to the NAND gate 42. Simultaneously, the FLIP-FLOP CIRCUIT FF1 transfers a one value provided by Vcc at its D input terminal and provides a one output value at its Q output terminal. Thus, the two one valued input signals to the NAND gate 42 assure that the oscillator-produced signals OSC on the other input terminal to the NAND gate 42 are transferred as the signal CLK. Consequently, both the oscillator and the clock continue to be generated during the normal operating condition of the circuit 32 after a reset signal has been furnished.

The circuit 32 may operate to place itself into the power down mode from which it responds in the manner described above to a reset command from the host computer. Alternatively, the circuit 32 may operate to place itself into a low power mode in which the clock output CLK is disabled but the oscillator 38 is still functioning. This low power mode allows the CLK signal to be turned on very rapidly, within the time constraints necessary to respond to a command from the host computer, without the need for a preliminary reset command.

To provide this ability to select either the power down or the low power mode, a pair of control signals WEB0 and WEB1 are provided by the microprocessor 33. These signals are transferred on the internal bus 39 to select the power condition desired by the microprocessor 33. A one value for both of these signals WEB0 and WEB1 indicates that both the OSC and the CLK signals are to be generated. A zero value for either signal indicates that the particular signal is to be turned off. However, when the signal OSC is turned off, the signal CLK also goes off since the clock cannot exist in the circuit 32 without the oscillator 38 operating. These signals WEB0 and WEB1 are accompanied by a write signal from the microprocessor 33 applied at the clock input terminals of the flip-flops FF2 and FF6.

A zero value for either the signal WEB0 or WEB1 causes an AND gate 46 to transfer a zero to the D input terminal of the flip-flop FF6. The write signal which accompanies the change in WEB0 or WEB1 at the clock input terminal of the flip-flop FF6 causes this signal to be transferred to the Q output terminal of the flip-flop FF6 and to the D input terminal of the flip-flop FF7. The OSC signal at the clock input terminal of flip-flop FF7 synchronizes and transfers the signal to the Q output terminal of flip-flop FF7. This zero value from the gate 46 also places a one value at the Q# output terminal of the flip-flop FF7. The signal at the Q# output terminal of the flip-flop FF7 is applied at an input terminal of a NAND gate 52.

Similarly, the signal on conductor WEB0 is applied to the D input terminal of the flip-flop FF2. This signal is transferred to the Q output terminal of the flip-flop FF2 in response to the write signal at the clock input terminal. The signal at the Q output terminal of flip-flop FF2 is transferred to the D input terminal of the flip-flop FF3, synchronized and transferred by the OSC signal at the clock terminal to the Q output terminal of flip-flop FF3, and is applied to an output terminal EN0 used to signal other circuitry to indicate the state that the oscillator is to assume. If the WEB0 signal is a zero value, the signal at the terminal EN0 is also a zero indicating that the oscillator 38 is off. If the WEB0 signal is a one value, the signal at the terminal EN0 is also a one indicating that the oscillator 38 is on. The same value of WEB0 is placed at an input to a NAND gate 54 from the Q output terminal of the flip-flop FF3. If WEB0 is a one value, a one is placed at the input terminal to the NAND gate 54; if WEB0 is a zero value, a zero is placed at the input terminal to the NAND gate 54.

Presuming that the signal WEB1 has a zero value indicating that the clock CLK is to be turned off while the signal WEB0 has a one value indicating that the oscillator 38 is to remain on, these signal and the write signal are furnished to the circuit 32 to place the various components in the conditions described above. In order to cause actual turn off of the clock signal CLK, a power down command is written to the latch 37 by the microprocessor 33; and the latch 37 is enabled by a write command at its load terminal from the microprocessor 33. This command generates a one value at the output terminal of a decoding circuit including an AND gate 56, a NOR gate 57, and an AND gate 58. The one value is transferred to the D input terminal of the flip-flop FF0. This signal generates a one value at the Q output terminal of the flip-flop FF0. This one value is applied to the reset terminals of the flip-flop circuits FF4 and FF5 and to the input of a NAND gate 50. The one value at the reset terminals of the flip-flop circuits FF4 and FF5 has no affect since no value is applied at the clock terminals of those flip-flops to transfer the value at the D input terminal; thus, the Q output terminal of the flip-flop circuit FF5 continues to provide a zero value to the gate 50. Therefore, the one value from the flip-flop circuit FF0 and the zero value from the flip-flop circuit FF5 cause a one value to be provided at the output terminal of the gate 50. The one from the gate 50 and the one value from the Q# terminal of the flip-flop circuit FF7 cause the NAND gate 52 to generate a zero valued output signal. The zero value from the gate 52 and the one value from the Q terminal of the flip-flop circuit FF3 cause the NAND gate 53 to produce a one valued output signal. The one valued output signal from the gate 53 and the one value produced at the Q terminal of the flip-flop circuit FF0 cause the NAND gate 54 to generate a zero valued output signal. This zero value from the gate 54 is combined with a one value produced at the output of the flip-flop circuit FF1 to generate a one at the output terminal of the NAND gate 42 to completely mask the clock signal CLK. Thus, the zero valued signal WEB1 causes the clock to be disabled.

It should be noted that a zero value for either the signal WEB0 or WEB1 causes an AND gate 46 to transfer a zero to the D input terminal of the flip-flop FF6. The write signal which accompanies the change in WEB0 or WEB1 at the clock input terminal of the flip-flop FF6 causes this signal to be transferred to the Q output terminal of the flip-flop FF6 and to the D input terminal of the flip-flop FF7. The OSC signal at the clock input terminal of flip-flop FF7 synchronizes and transfers the zero signal to the Q output terminal of flip-flop FF7 and to the output terminal EN1 to indicate that the clock signal CLK is disabled.

In a similar manner, in response to the one value of WEB0, a one value is produced at the Q output terminal of the flip-flop FF3. This generates a one value at the terminal EN0 to indicate that the oscillator is being left on. The one value of WEB0 also places a zero at the Q# output terminal of the flip-flop FF3. The zero produced at the Q# output terminal of flip-flop FF3 and a one value from the Q# terminal of the flip-flop circuit FF4 maintains a one value at the output terminal of the NAND gate 41 and keeps the oscillator 38 enabled.

Thus, the circuit 32 allows the clock signal CLK to be selectively disabled while the oscillator signal OSC continues to be generated. In a similar manner, the clock and the oscillator may both be disabled by zero values written on both of the conductors WEB0 and WEB1. Presuming that both the WEB0 and WEB1 signals are zero value and the write signal is applied at the clock input terminal of flip-flop circuit FF2,, the values produced at the EN0 and EN1 output terminals are both zeroes indicating to other circuitry that both the oscillator 38 and the clock signal CLK are turned off.

When the power down signal is furnished by the microprocessor 33 along with a write to load terminal of the latch 37, a one value is generated by the decode circuitry at the output of the gate 58. this one value is applied at the D input terminal to the flip-flop circuit FF0. This causes a one value to appear at the Q output terminal of the flip-flop circuit FF0. the one value is applied at an input terminal of each of the gates 41 and 54. The one value at the gate 41 causes the gate 41 to generate a zero output value and disable the oscillator 38. The zero valued signal ENOSC also disables the transfer of the oscillating signal OSC by the OR gate 44. The one value at the input to the gate 54 causes a zero to be generated at the output terminal of the gate 54 and at an input terminal to the gate 42. The zero value at the input terminal to the gate 42 causes a constant one value to be produced at the output of the gate 42 thereby masking any oscillating clock output during the period during which the signal OSC is ramping down to zero.

By tracing the operation of the circuit 32, it will be seen that when the WEB0 signal is a zero and the WEB1 signal is a one, both the generation of the clock signal CLK and the generation of the oscillator signal OSC are terminated. Thus, the circuit 32 functions in the manner described to place itself in either the low power or the power off mode of operation.

It should be noted that the oscillator 38 can be turned back on by the appearance of a RESET signal on the reset input terminal to the circuit 32. Such a signal is typically produced by the microprocessor 22 of the host computer after it has switched the memory array to the low power stage of operation and desires to enable it again. Although such a reset signal might be produced by the microprocessor 33, the reset operation requires a relatively substantial period of time for the oscillator 38 to produce square waves of the appropriate form, a period not within the specification for a memory array such as a hard disk drive to respond to a command. As has been shown, this total shut down of the oscillator 38 does not occur in the situation in which only the clock output has been discontinued.

It is valuable to be able to shut down only the clock signals because the clock circuitry is one of the most energy hungry of the internal components of a flash EEPROM memory array and its controlling circuitry. This energy use occurs because the clock is directed to all parts of a component over a large number of conductors (called a clock tree). These conductors place a significant energy drain on the system. Therefore, it is desirable that such circuitry be disabled. The present invention provides for disabling the generation of the clock signal while maintaining the oscillator in operation so that the clock signals may be turned back on within the time for responding to an ordinary command from the host computer to the flash EEPROM memory array. This allows power to be reduced to the very minimum possible within the system requirements.

In order to turn the clock back on when only the clock signal CLK has been disabled, a system signal PDINT is utilized. The signal PDINT is produced in response to the receipt by the circuit 32 of any host command. The PDINT signal is applied at the clock input terminal to the flip-flop FF4 so that a one value (the D input terminal is tied to Vcc) is transferred to the Q output terminal of the flip-flop FF4. This one value is applied to the D terminal of the flip-flop FF5, synchronized with the OSC signal appearing at the clock input terminal, appears at the Q output terminal, and is applied at the input terminal of the gate 50. The gate 50 still receives the one value furnished at the output terminal of the AND gate 58 and transferred by way of the Q terminal of the flip-flop FF0; it will be recalled that this value initiated the shutoff of the clock signal CLK. This generates a zero value at the input terminal to the NAND gate 52. The gate 52, thus, transfers a one to its output terminal. This one value is applied along with another one value (furnished in response to the one value on WEB0 at the Q output terminal of the flip-flop FF3) to an input terminal of the NAND gate 53 causing it to generate a zero valued output. The zero value from the gate 53 is applied as input to the gate 54 and is transferred by the gate 54 as a one valued output and applied to the input terminal of the NAND gate 42. At the same time, a one value is applied to the gate 42 from the Q output terminal of the flip-flop FF1. The two one valued signals cause the gate 42 to transfer the oscillating signal OSC appearing on the third input terminal to the output terminal as the signal CLK.

It will be noted that since the signal OSC is being furnished constantly to the gate 42, the only delay in furnishing the clock signal CLK after the PDINT signal is received is that required to synchronize the PDINT signal through the flip-flops FF4 and FF5 and that required for the transfer through the gates leading to the output terminal of the gate 42. Consequently, the signal CLK is available within a very short period of time. Moreover, because the signal initiated by the PDINT signal is synchronized to the oscillator signal at the flip-flop FF5, the very first pulse of the signal CLK which is generated is of full width and may be used by the circuitry to which it is directed. Both of these factors make the turning on of the clock signal in response to the PDINT signal very rapid.

The typical specification for an IDE electro-mechanical hard disk drive requires that a drive respond to a command from the host computer within approximately 400 nanoseconds. The operation of the circuit 32 to furnish the signal CLK is well within these constraints.

If the power down command is such that the oscillator 38 as well as the clock is turned off and the circuitry is sufficiently responsive, a PDINT signal generated on the receipt of a command from the host computer may also be used to initiate turn on of the oscillator 38 and the generation of the clock signal CLK. The PDINT signal generates a zero value at the Q# output terminal of the flip-flop FF4. The zero value is applied to the input terminal to the NAND gate 41, generating a one value at the output terminal of the gate 41. This one value causes the oscillator 38 to turn on in essentially the same manner as occurs when the reset signal is applied. A difference, however, is that the generation of the clock signal CLK requires that a write signal be generated by the microprocessor 33. This allows the microprocessor to provide a delay before the clock starts so that the oscillator pulses will be of appropriate form before the clock is turned on. This may be provided by a small process in read only memory 35 which runs a timer through the microprocessor 33 in response to the PDINT signal.

A feature of the invention is that the circuit 32 includes circuitry for assuring that an inadvertent power down does not occur. To accomplish this, an output value is taken at the output terminal of the NAND gate 53. Whenever the signals on both of the conductors WEB0 and WEB1 are ones, this value from the gate 53 is a zero. The zero value is transferred to the reset terminal of the latch 37 and precludes the generation of a one value at the output terminal of the AND gate 58 in response to a power down command. Thus, one of the two conductors WEB0 or WEB1 must be a zero before any power down can occur. This two stage process helps to eliminate inadvertent power downs in response to a spurious signal.

Figure 5:
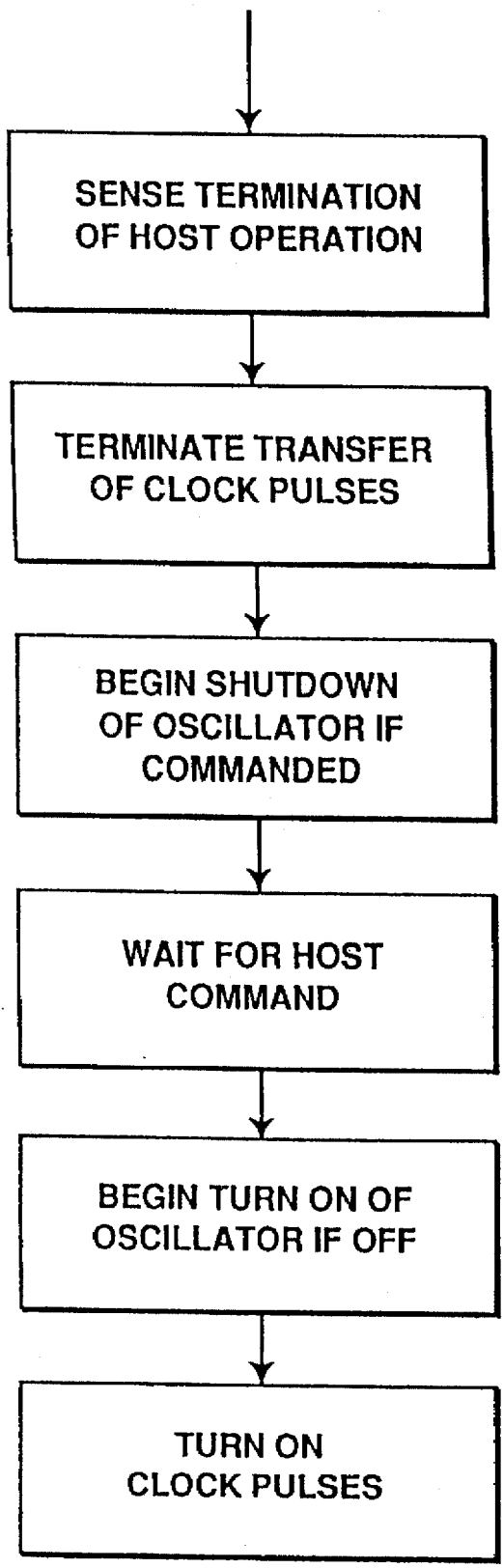
FIG. 5 is a flow chart illustrating the steps of a method in accordance with the present invention.

FIG. 5 illustrates the steps of a process which may be stored in read only memory within the control circuitry of the array of which circuit 32 is a part and run on the microprocessor 33 to provide for the automatic disabling of the clock signal CLK as taught in the above description.

The process starts whenever some operation is completed by the array. At this point, a software counter running as a process on the microprocessor 33 is set. At the frequency of the clock of the microprocessor 33, some predetermined number of counts are needed for the timer to provide the correct delay interval. If the counter counts down to zero without being reset indicating that there is no active function taking place in the array, then the power down process is initiated by the microprocessor 33. This command furnishes the signals on the WEB0 and WEB1 conductors and the write signal to the Flip-flop FF2 to set up the conditions described above by which the clock signal may be powered down while the oscillator is to continue running. These signals set up the circuit 32 so that it is ready to respond to the power down command. Then the power down command is written to the latch 37. When this command is received by the latch 37, the signal to terminate the clock signal CLK is generated by the decoding circuitry at the output terminal of the AND gate 58 and the circuit 32 functions as described to terminate the clock signal.

In order to respond to a command from the host computer, the PDINT signal is generated to initiate the process for turning the clock back on in the manner described.

It should be noted that it is possible to reduce the use of energy further by turning off both the circuit 32 generating clock pulses for the control circuitry and the microprocessor 33. In the embodiment in which the microprocessor 33 is an Intel 80188, a command is provided by which it is possible to reduce the power level used in driving the microprocessor. Thus, it is possible for the host to turn off both the microprocessor oscillator and the oscillator 38 of the circuit 32 to further conserve energy. In such a case, the power down signal is sent from the host computer both to the latch 37 of the circuit 32 and to the microprocessor 33.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. An apparatus for use with a computer component circuit, the apparatus comprising:
    a microprocessor;
    an oscillator for providing a pattern of signals;
    a clock signal generator, coupled to the oscillator, for generating clock pulses based on the pattern of signals; and
    wherein the microprocessor is for running a first process to selectively disable the oscillator and the clock signal generator at the completion of any operation by the component circuit.

2. The apparatus of claim 1, further comprising:
    a plurality of gates coupled to the oscillator and the clock signal generator; and
    wherein the microprocessor is for running the first process to selectively disable the oscillator and the clock signal generator by controlling the plurality of gates.

3. The apparatus of claim 1, wherein the microprocessor is also for running a second process to enable the oscillator and the clock signal generator in response to any command to the component circuit from a host computer.

4. A computer subsystem comprising:
    a microprocessor for managing the subsystem;
    an oscillator for generating a pattern of signals;
    a clock generator for providing clock signals based on the pattern of signals; and
    a series of gates for selectively disabling the oscillator and the clock generator upon completion of any operation by the subsystem.

5. The computer subsystem of claim 4, wherein the series of gates is also for enabling the oscillator and the clock signal generator in response to any command to the subsystem from a host computer.

6. A computer system comprising:
    a central processing unit;
    a main memory;
    a bus coupled to the central processing unit and the main memory; and
    a subsystem coupled ot the bus, the subsystem comprising,
        a control circuit that includes
            a microprocessor for managing the subsystem,
            an oscillator for generating a pattern of signals,
            a clock generator for providing clock signals based on the pattern of signals, and
            a series of gates for selectively disabling the oscillator and the clock generator upon completion of any operation by the subsystem, and for enabling the oscillator and the clock generator in response to any command to the subsystem from the central processing unit.

7. A method for controlling the use of power in a computer subsystem, the computer subsystem including a microprocessor for managing the subsystem, an oscillator for generating a pattern of signals, and a clock generator for providing clock signals based on the pattern of signals, the method comprising the step of:

selectively disabling the oscillator and the clock generator in response to commands from the microprocessor after the termination of any operation received from a host computer.

8. An apparatus for use with a computer component circuit, the apparatus comprising:

a means for providing a repeating pattern of signals;

a means for generating clock pulses based on the repeating pattern of signals; and means for selectively disabling the means for providing and the means for generating at the completion of any operation by the component circuit.

9. The apparatus of claim 8, further comprising means for enabling the means for providing and the means for generating in response to any command to the component circuit from a host computer.

* * * * *